US012745689B2

(12) United States Patent
Kitic et al.

(10) Patent No.: US 12,745,689 B2
(45) Date of Patent: Sep. 29, 2026

(54) SYSTEM AND METHOD FOR INTELLIGENT SOIL SAMPLING

(71) Applicant: Institut Biosens—Istrazivacko-Razvojni Institut Za Informacione Tehnologije Biosistema, Novi Sad (RS)

(72) Inventors: Goran Kitic, Novi Sad (RS); Marko Panic, Novi Sad (RS); Sanja Brdar, Novi Sad (RS); Vladimir Crnojevic, Novi Sad (RS); Damir Krkljes, Novi Sad (RS); Caba Petes, Novi Sad (RS); Slobodan Birgermajer, Novi Sad (RS)

(73) Assignee: Institut Biosens—Istrazivacko-Razvojni Institut Za Informacione Tehnologije Biosistema, Novi Sad (RS)

( * ) Notice: Subject to any disclaimer, the term of this patent is extended or adjusted under 35 U.S.C. 154(b) by 761 days.

(21) Appl. No.: 18/014,150

(22) PCT Filed: Jul. 8, 2021

(86) PCT No.: PCT/RS2021/000010
§ 371 (c)(1),
(2) Date: Dec. 31, 2022

(87) PCT Pub. No.: WO2022/010372
PCT Pub. Date: Jan. 13, 2022

(65) Prior Publication Data

US 2023/0255133 A1 Aug. 17, 2023

(30) Foreign Application Priority Data

Jul. 10, 2020 (RS) ................................ P-2020/0817

(51) Int. Cl.
*A01B 79/00* (2006.01)
*A01B 79/02* (2006.01)
*G06V 20/10* (2022.01)

(52) U.S. Cl.
CPC ........... *A01B 79/005* (2013.01); *A01B 79/02* (2013.01); *G06V 20/188* (2022.01)

(58) Field of Classification Search
CPC ..... A01B 79/005; A01B 79/02; G06V 20/188
See application file for complete search history.

(56) References Cited

U.S. PATENT DOCUMENTS 11,785,877 B2 * 10/2023 Lewis et al. ........... A01B 79/02
702/5
2016/0063420 A1 3/2016 Tomii et al.
(Continued)

FOREIGN PATENT DOCUMENTS

EP 1754405 B1 2/2007
EP 3529556 B1 8/2019
EP 3071009 B1 * 12/2020 ............. A01B 9/008

*Primary Examiner* — Tara Mayo
(74) *Attorney, Agent, or Firm* — The Watson IP Group; Jovan N. Jovanovic

(57) ABSTRACT

A system and method for soil sampling utilizing a robotic system that determines sampling points through artificial intelligence algorithms. The robotic system comprises a platform with sampling modules that communicates with a server hosting a localization module. The localization module processes satellite imagery from multiple spectral channels and high-resolution drone images for a given parcel, generates sampling zones, and determines coordinates of optimal representative points for efficient land sampling. Intelligent sampling proceeds through several steps: sampling limits are defined and a mask is applied to the plot, a pixel matrix of vegetation indices is formed and normalized, and a K-means algorithm is applied across multiple spatial resolutions. The algorithm calculates the probability that
(Continued)

each pixel belongs to one of the K zones, accounting for surrounding pixels across varying spatial resolutions. A consensus step determines final zones and estimates pixel affiliation probabilities based on local histograms of the matrix entities.

14 Claims, 7 Drawing Sheets

(56) References Cited

U.S. PATENT DOCUMENTS

| | | | |
|---|---|---|---|
| 2016/0073573 A1 | 3/2016 | Hedley et al. | |
| 2016/0078375 A1 | 3/2016 | Hedley et al. | |
| 2016/0232621 A1 | 8/2016 | Hedley et al. | |
| 2016/0270289 A1 | 9/2016 | Schildroth | |
| 2017/0041407 A1 | 2/2017 | Wilbur et al. | |
| 2017/0042081 A1 | 2/2017 | Zumbach et al. | |
| 2021/0386011 A1* | 12/2021 | Goering ............... | A01C 21/007 |

* cited by examiner

SYSTEM AND METHOD FOR INTELLIGENT SOIL SAMPLING

TECHNICAL FIELD

The invention belongs to the field of measurement and the application of artificial intelligence in agriculture. The designation according to the International Patent Classification (IPC) is: G06Q50/02, G06Q10, G01C21/32, A01B79/005, and A01C21/005.

BACKGROUND ART

The invention solves the problem of determining optimal soil sampling locations on a given plot of land for a robotic platform that takes soil sampling measurements.

The invention solves this problem of determining optimal sampling points (sites) by applying artificial intelligence algorithms located on the server platform of the system and controlling the hardware system or robotic platform to efficiently sample the plot of land (i.e., to make the soil sampling locations the best representatives of a certain part of the plot of land).

The invention solves the problem of the current movement of robotic platforms for soil sampling in a way that increases the efficiency of sampling with the selection of sampling locations based on efficient artificial intelligence algorithms.

The current state of the art includes a scientific paper entitled "Optical Sensing of Nitrogen, Phosphorus and Potassium: A Spectrophotometrical Approach Toward Smart Nutrient Deployment", which differs from the proposed invention by a different principle of measurement, namely, the current invention uses ion-selective electrodes, while in the paper it is explained the approach for measurement through the optical principle of detection.

Also, to the current state of the art belongs a paper entitled "Task-based agricultural mobile robots in arable farming: A review", which uses the optical principle of detection, not ion-selective electrodes, and does not mention an artificial intelligence algorithm for selecting sampling points within a plot.

In addition to the above papers, the state of the art includes the following protected solutions: Patent application US20160232621 entitled "Methods and systems for recommending agricultural activities" published on Aug. 11, 2016, which also discusses the algorithms of recommendation, with the invention talking about the algorithm of recommendation for optimal soil sampling sites. This patent application does not specify a physical system for automated sampling and analysis of soil. However, the essential difference is reflected in the fact that in the present invention, artificial intelligence algorithms are used to create an optimal soil sampling pattern within the plot's homogeneous zones through sampling points, while in the above application, the results of the soil samples are used to determine the zones. Furthermore, there is no part in the application addressing pixel enlargement and cluster mapping in other resolutions, which contribute to finding meaningful homogeneous zone boundaries from the point of view of further use. The application states that the zones are made from one or more sources (soil analysis, vegetation indices, yield maps, elevation, etc.).

Patent application US20160078375 entitled "Methods and systems for recommending agricultural activities" published on Mar. 17, 2016, as well as applications US20160073573 and US20160078375, also belong to the prior art and have almost the same differences compared to the above-mentioned application (US20160232621) compared to the present invention.

Patent application EP3529556A1 entitled "Land mapping and guidance system" published on 28 Aug. 2019 belongs to the state of the art. The difference to the proposed invention is reflected in the fact that the current invention uses an intelligent algorithm to determine the trajectory of the robot, while in the reported system, the robot moves through the selected area in the form of a meandering path covering the entire plot area and maps the parameters of interest, without the use of more advanced algorithms and artificial intelligence. The application sees anomalies in the field, slope data; however, there is no fertilization recommendation as a system output.

Patent EP1754405 B1 entitled "Mobile station in combination with an unmanned vehicle" issued on 5 Nov. 2008 belongs to the prior art, but no phosphorus and potassium analysis, acidity analysis, electrical conductivity analysis, and no intelligent recommendations for soil sampling locations are performed. These are the basic differences with respect to the present invention.

Patent application US20140379228 A1 entitled "Method and system for optimizing planting operations" published on 25 Dec. 2014 is about a seeder that does not measure electrical conductivity, and it also samples everywhere without the use of artificial intelligence algorithms. Fertilization is done in real time based on the results of the analysis and according to the description in the application; it is done on the fly. This is not the case in the present invention because it presents a system that includes algorithms for optimal path planning and fertilization recommendation that are located on the server, and includes artificial intelligence in agriculture.

DISCLOSURE OF THE INVENTION

The growth of the world population increases the demand for food and arable land needed for its production. Since arable land resources are limited and very often degraded due to poor management, there is a need to improve agrotechnical measures to increase the yield in an environmentally sustainable way. Classical methods for soil analysis include taking on average, 15 to 20 soil samples from a plot of 5 ha at a depth of 30 cm. The mixture of these samples is prepared and sent to a laboratory for analysis as a single sample representing the whole plot. The results of the analysis are obtained after 10 to 14 days. It should be noted that classical methods are physically demanding since the soil is sampled with hand tools. They are also time-inefficient and do not preserve information about the exact location of individual samples. For these reasons, the results of the analysis obtained deviate from reality, especially in the case of one of the most important nutrients in the soil, such as nitrogen, since it is extremely temporally and spatially variable. For the reasons stated, there is a need for a new system and method that processes the results in a short time and gives a real temporal and spatial picture, based on which an adequate fertilizer in optimal quantities can be applied where it is needed, and thus a better yield with less investment is achieved.

Sowing and fertilization, as stages of production of a plant species on a certain plot, should be done after the agrochemical analysis of soil with adequate methods and systems for assessing soil quality and the presence of nutrients that plants use during their growth and development. So far, farmers have applied uniform amounts of fertilizer throughout a plot, which is suboptimal from the economic point of view and unsustainable in the ecological sense. Namely, plants take nutrients from the soil in the quantities they need for proper growth and development, while the rest either evaporates, creating greenhouse gases, or reaches the groundwater and surface water, eventually polluting them. In this way, the reproduction of algae is encouraged, leading to a lack of oxygen and thus fish kills in aquatic habitats. These pollutants also affect people. For example, exceeding the allowed concentration of nitrates in water leads to problems in child development.

The present invention represents a new system and method for adequate sampling of soil nutrients in a given plot of land (nitrogen primarily, but also other nutrients in the soil).

The present invention is characterized by a relatively short time needed to get analysis results since the procedure of soil sampling, sample analysis, and sending the results to the server takes 15 to 20 minutes per sample. The significance of this solution is reflected in the rational and correct selection of parts of the plot for sampling to determine the percentage of nutrients that need to be compensated. The concentration of inorganic nitrogen, phosphorus, potassium, calcium, and magnesium is analyzed in the soil sample. Furthermore, parameters such as, but not limited to, pH and soil moisture, organic carbon, soil particle size, iron oxide concentration, the composition of minerals, and dissolved salts could be determined as well.

The basic idea of the present invention is the accuracy and quick soil sample analysis through a new method and system of software components that improve the hardware part of the system in the field to adequately create a set of points and an optimal route for soil sampling on a given part of the plot. A soil sampling map of a part of a plot or a whole plot (less often) is a map by which a system moves (route) using the intelligence of the algorithms of the present invention. The set of sampling points, which are prepared for the platform to move within the plot, involves a K-means algorithm for grouping pixels with similar spectral characteristics into homogeneous zones. By additional spatial filtering of the obtained K-means labels, with an adjustable size of the spatial filter mask and AI-driven decision making a reliable consensus is obtained on the borders of homogeneous zones according to the size of the fertilizer spreaders. The upper bound for adjusting the size of spatial filter is guided by the length of a fertilizer spreader. The invention proposes and implements an innovative way of moving a platform (robot) for soil sampling and analysis of nutrient concentration.

The invention is a system of modules that are combined with a robotic platform to make a new system of hardware-software components for a new method of soil sampling by applying artificial intelligence algorithms for optimal selection of sampling points (georeferenced coordinates of sampling sites) that determine the robotic platform's trajectory, which takes, and analyze samples on-the-go, providing the insight of deficiency of the nutrients necessary for normal plant growth and development in the soil.

BEST MODE FOR CARRYING OUT OF THE INVENTION

There is a need to develop new technologies in agriculture to use the arable land optimally, thus providing adequate amounts and quality of food for the growing world population. In addition to available water, the most important parameters for optimal growth and development of plants, and consequently achieved yield, are nutrients, where nitrogen plays the most important role. The challenge of monitoring the concentration of nitrogen in the soil is not an easy task since its concentration varies in time and space, and this variability adversely affects the optimal fertilization, affecting maximum yield. Precise determination of nitrogen concentration in the soil at a given location is a prerequisite for precise application of fertilizers, adequate savings, and minimal negative impact on the ecological system.

The harmfulness of a larger amount of nitrogen in the soil is reflected in the reduction of oxygen in the waters, which causes the deterioration of fish stocks and reduces the biodiversity of animal species. Furthermore, water that contains nitrates is no longer suitable for drinking. One part of the nitrogen evaporates and reaches the atmosphere, increasing the negative greenhouse effect. The third negative effect of excess nitrogen is increased soil acidity. The present invention significantly reduces the negative effects of over-fertilization on the environment by optimal soil sampling for nutrient assessment and subsequent prescribed fertilization.

The present invention includes a reliable and fast sampling at optimal locations within the field plot, measurement, and mapping of nitrates in soil enabled by the system and operation of an autonomous platform (realized as a prototype of robot) that samples soil, prepares a sample by mixing with an appropriate amount of deionized water, and finally, using a sensor module, determines the amount of nitrate in the prepared soil sample.

The present invention enables precise mapping of the amount of nitrate-nitrogen available in soil with a high spatial and temporal resolution, and through a new method and system of algorithms for selecting optimal sampling point locations.

The system consists of an automated platform on which other functional parts of the system are placed. In the specific case, the platform of the manufacturer Clearpath Robotics Inc. was used, but the invention is not conditioned by the choice of platform, and it can be applied to any other adequate platform, as well as to a tractor or any other agricultural machinery. The system can also navigate itself with the help of GPS, where the presence of a technical person is not necessary, but in most countries, it is mandatory due to the valid legal regulations regarding autonomous vehicles.

Figure 1:
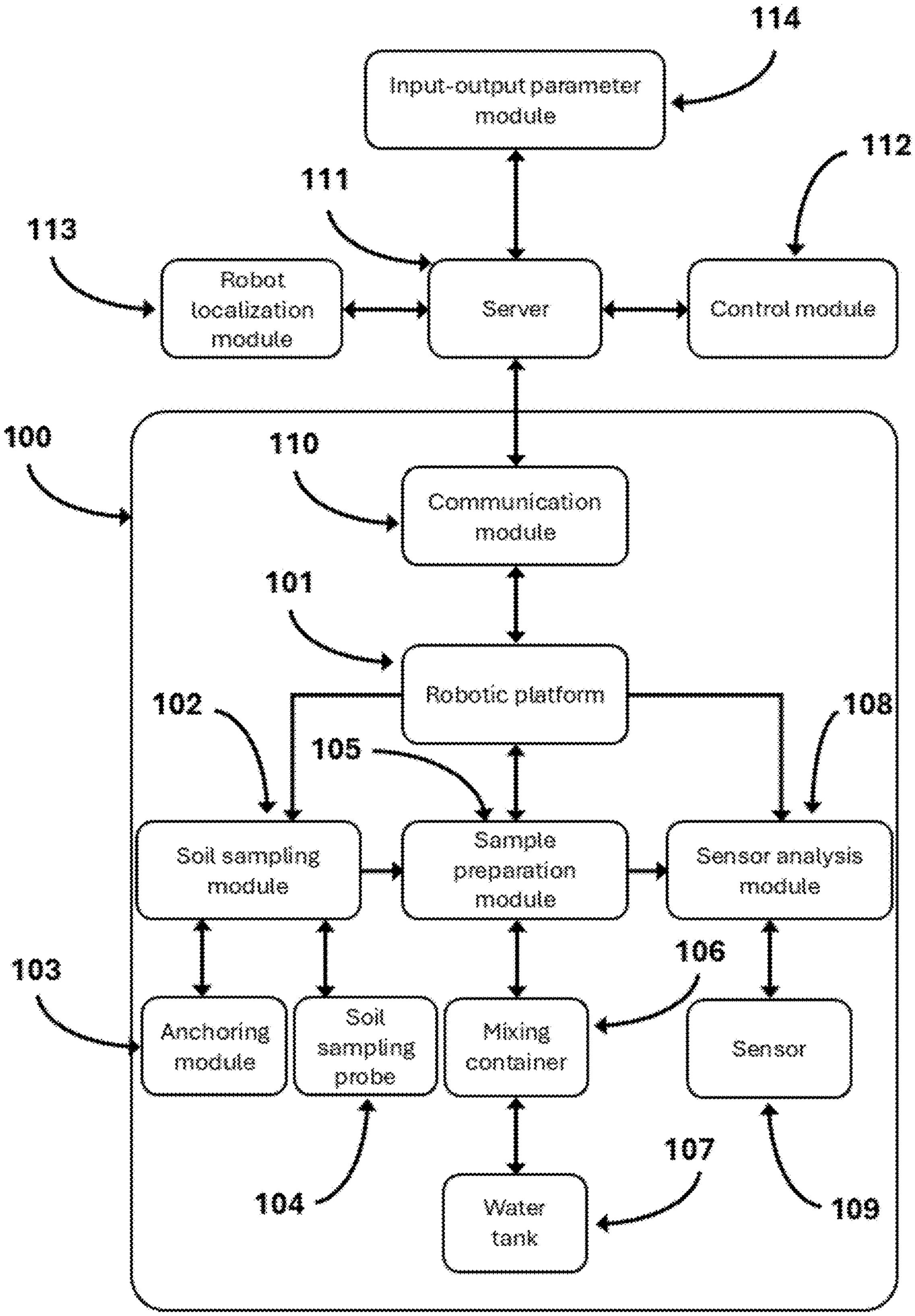
FIG. 1 shows the innovative system for soil sampling and analysis.

In FIG. 1, described innovative system for intelligent sampling is presented. The system is composed of robotic system 100, server 111, robot localization module 113, control module 112 and input-output parameter module 114.

The robotic system 100 includes a robotic platform 101 as a central component that includes four core modules: module 102 for soil sampling, module 105 for sample preparation, module 108 for soil sampling analysis, and communication module 110.

The server 111 represents a central platform for communication with a robot localization module 113, which represents the core innovative component of the present invention, the control module 112, having a coordination-management role, and the robotic platform 101.

The soil sampling module 102 contains the anchoring module 103, which allows the robotic platform 101 to be anchored to the ground. Successful anchoring allows the robotic platform 101 to avoid lifting when the soil sampling probe 104 penetrates the soil, as well as to reduce the load on the wheels of the robotic platform 101 during the soil sampling the soil sampling probe 104 extraction from the ground. Module 102 for soil sampling contains the soil sampling probe 104, which takes the soil sample.

The sample preparation module 105 prepares the obtained soil sample received from the soil sampling module 102 by mixing it with the water from the water tank 107 in the mixing container 106 to which it is connected. The amount of added water is determined based on the measurement of the weight of the soil sample. This functionality is integrated into module 105 for sample preparation via force sensors, or the like. The sample preparation module 105 is placed below the sampling module 102, and from there, the soil sample is directed to a mixing container 106 in which it is mixed with deionized water coming from the water tank 107. Deionized water is used since it does not contain any ions that would affect the measurement results of sensor 109, and it is necessary for the proper functioning of sensor 109, which needs an aqueous solution of the soil sample.

The sample analysis module 108 accesses the prepared soil sample from the sample preparation module 105 and uses the sensor 109 to measure the presence of certain ions of nitrate, nitrogen, phosphorus, potassium, calcium, carbon, magnesium, iron, etc., then measures the electrical conductivity and acidity of the soil, moisture, particle size, etc. It is important to note that within the sample analysis module 108, there are also appropriate calibration standards used to calibrate the sensor 109 before the series of measurements, thus achieving measurement accuracy and repeatability. The sensor 109 uses several probes to characterize soil samples:

- ion-selective electrodes (produced by Clean Growth) for the following ions: Ca2+, Cl−, K+, Na+, NH4+, NO3−, Mg2+, and P[HPO42−],
- probes for measuring electrical conductivity and acidity It is important to note that the present invention, besides stated parameters, could also measure soil moisture content, conduct hyperspectral analysis based on which the following parameters can be estimated: moisture, organic matter (organic carbon), particle size, iron oxide concentration, mineral content, dissolved salts, heavy metals, and the like.

Data on the concentrations of nitrates and other listed substances and soil characteristics are sent by the sample analysis module 108 to the robotic platform 101, and the information is forwarded via the communication module 110 to the server 111 and the control module 112. Likewise, all information regarding the status of the whole process, including information about the robotic platform 101 movement, the indicator of the current sampling point, the status of anchoring and sampling coming from the soil sampling module 102, the status of soil 45 preparation coming from the sample preparation module 105, and the status of sample analysis together with the measurement results coming from sensor analysis module are collected by robotic platform 101 and sent wirelessly to the server 111 over the communication module 110.

All the activities and statuses are monitored and coordinated by the control module 112, which communicates with the server 111 and the robotic platform 101.

The robotic platform 101 also integrates a global positioning system (GPS) of high accuracy and a light detection and ranging (LIDAR) system, enabling obstacle detection and avoidance. The robotic system 100 of hardware-software components for soil sampling represents a digital platform, which follows optimal sampling locations in the form of coordinate points. The list of locations is based on high-resolution multispectral or RGB images acquired by the satellite or drone. The core innovation of the present invention is reflected in the creation of the locations of the sampling points by using artificial intelligence algorithms.

As stated above, the present invention includes an application (user software), an input-output parameters module 114, that communicates with module 113 for robot localization. It is already explained that module 113 for localization is placed on server 111 and represents the core innovation of the present invention since it determines soil sampling locations.

When the farmer sets the coordinates of the parcel via module 114, this data is sent to the robot localization module 113, which communicates with the control module 112 using the server 111 for further sampling activities with the platform 101. The control module 112 receives sampling points from the robot localization module 113. The control module 112 can further change the path due to natural obstacles and the like. The control module 112 on this occasion determines the starting point to which the robotic platform 101 returns after performing sampling at the last point. When the control module 112 confirms the route, it sends the route via server 111 to the robotic system 100, which performs the task of soil sampling. During the task execution, the communication module 112 can monitor the status of the robotic platform 101, and have insight into whether it has successfully arrived at the location, sampled, analyzed the soil, etc. The status of the robotic platform 101 is refreshed every 5 minutes, or at the request of the control module 112. These statuses are obtained by the platform 101 from the sampling module 102, the preparation module 105, and the analysis module 108. When the robotic system 100 finishes with the last point, a fertilization recommendation can be made in coordination with server 111.

On the server 111, there is the robot localization module 113 comprising artificial intelligence algorithms, which represents the innovation of the invention in the sense that it provides an optimized selection of points at which the soil is sampled.

Artificial intelligence is involved in the operation of the robotic system 100 of the invention, through the module 113, which specifies GPS locations of sampling points within the field for the analysis of nitrates and other nutrients in the soil. The invention provides a solution in the form of the robotic system 100 for the optimal soil sampling on the observed field parcel. The optimal soil sampling implies the utilization of advanced algorithms of artificial intelligence, implemented within module 113, which determines the number of soil samples and their locations within the parcel. Algorithms take multispectral or RGB images of the observed parcel, obtained from satellite or high-resolution cameras mounted on unmanned aerial vehicles (UAV) as input. From the calculated vegetation indices and their spatial distribution from images, algorithms divide the parcel into homogeneous zones with different interzones statistics of vegetation indices and generate locations for soil sampling within each zone, where the robotic system 100 takes samples autonomously. In FIG. 4*a*, FIG. 4*b*, FIG. 5*a*, FIG. 5*b*, FIG. 6*a*, FIG. 6*b*, and FIG. 7 which present results of zone creation and sampling points generation, an image from a drone is used as input data for the algorithms. The robotic platform 101 can be any platform that is capable of autonomous moving within the parcel. GPS coordinates of sampling points, generated from module 113, for the localization of the robotic platform 101 within the parcel are given to platform 101 from module 112. In addition to the analysis of the presence of nitrogen, potassium, sodium, can be analyzed the presence of calcium, chlorine, nitrates, phosphorus, magnesium or can be measured electrical conductivity of soil, its acidity, humidity, organic carbon, soil particle size, concentration of iron oxide or dissolved salts, or can be determined mineral composition, etc.

After the optimal locations for soil sampling are determined by artificial intelligence algorithms, the platform 101 moves from the predefined starting point, across the shortest trajectory within the parcel, towards these locations. There are also points on the trajectory, which platform 101 needs to traverse, where soil sampling is omitted. Within the invention, there is a check on these points of trajectory, where the robotic system 100 comes, where the soil sampling with analysis will be conducted or omitted, and this role is dedicated to the control module 112 on the server 111. All the steps mentioned contain positive or negative outcomes about which platform 101 regularly reports the input-output module 114.

Figure 2:
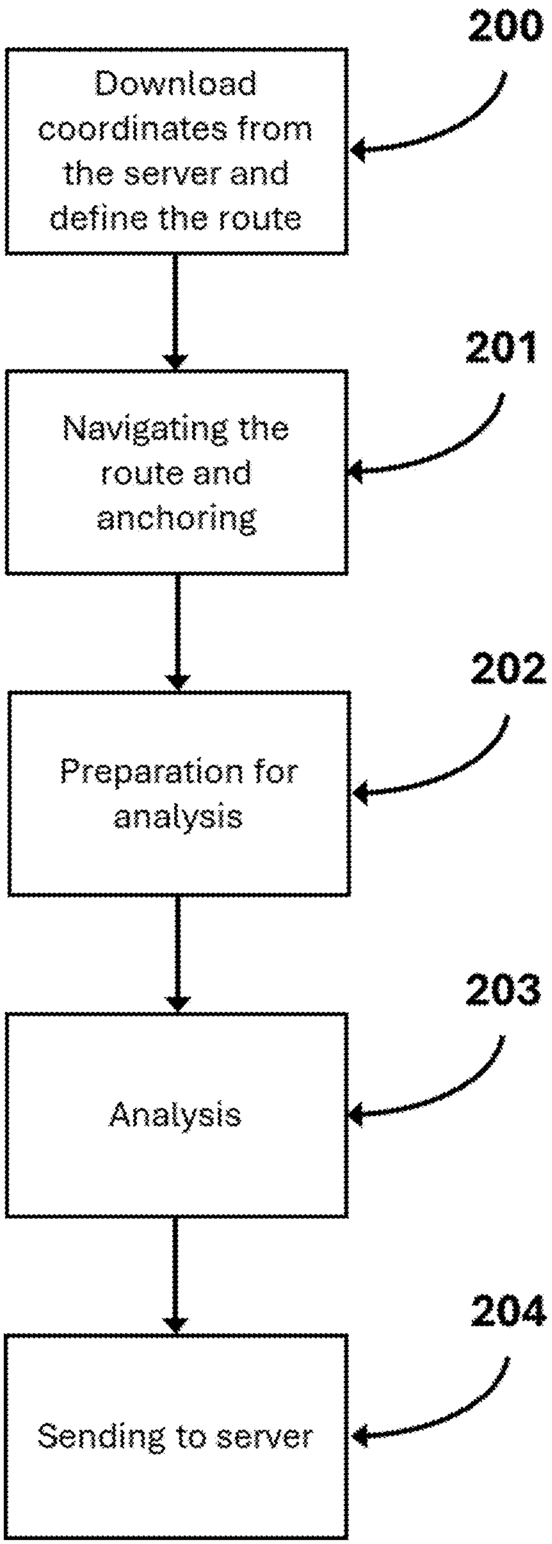
FIG. 2 shows the innovative method of the invention.

FIG. 2 shows a method of the invention, which consists of: step 200 which consists of retrieving the GPS coordinates of the locations for soil sampling from server, then step 201 where the moving of the platform 101 to the coordinates of points and soils sampling, step 202 preparing for soil sample analysis, step 203 of sample analysis and finally step 204 in which data from the analysis are sent to the server.

Figure 3:
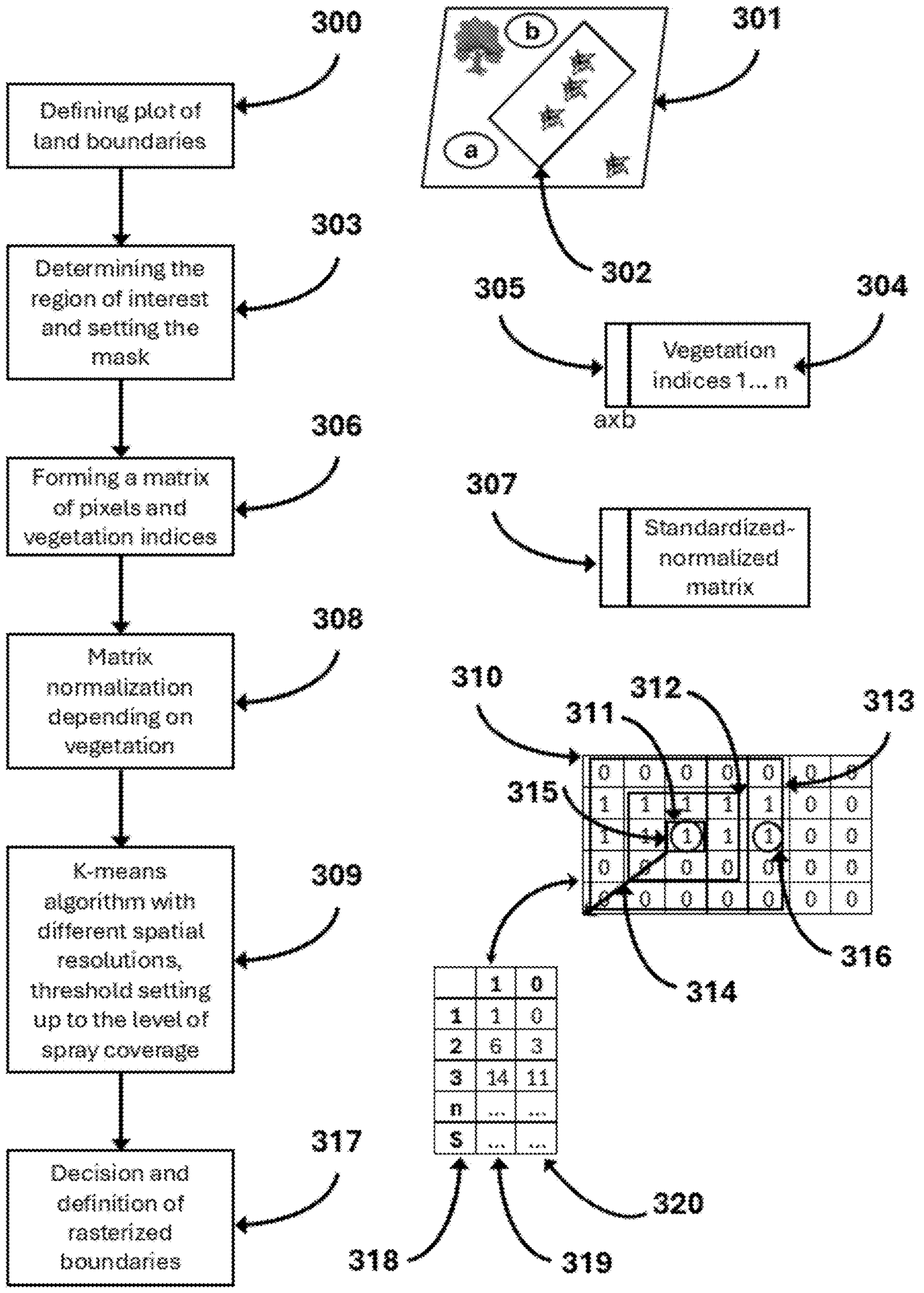
FIG. 3 shows the innovative step of determining the soil sampling points.

FIG. 3 presents the innovation of step 200 and illustrates it in more detail through the following steps: step 300 where the boundary of parcel is defined by the user 301 for which soil sampling needs to be done then step 302 for determining the region of interest (ROI) for extracting pixels in the image (satellite or drone image) belonging to parcel boundary from step 301 and step 303 which defines mask for the parcel region from ROI.

Figure 4A:
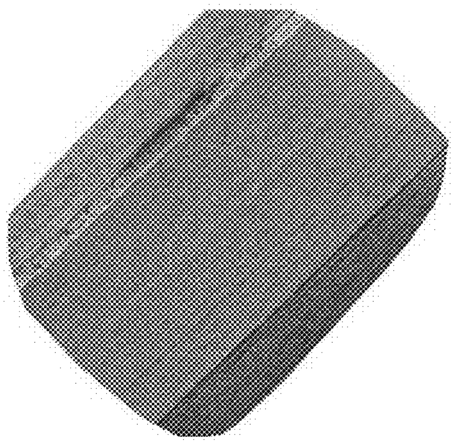
FIG. 4*a* illustrates the plot defined by the user for which soil sampling needs to be done.
Figure 4B:
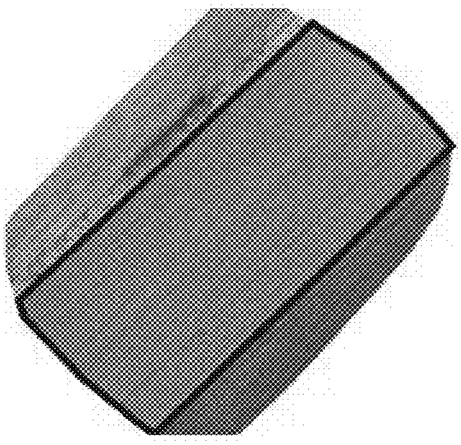
FIG. 4*b* illustrates a mask for determining the region of interest by extracting pixels in the image belonging to the plot for which soil sampling needs to be done.

FIG. 4*a* illustrates a parcel obtained from step 301, and FIG. 4*b* illustrates a mask from step 302, which defines a region of interest (ROI). For the extracted pixels from field plot 301, vegetation indices are calculated that can be determined based on available spectral channels, either from the camera mounted on a drone or satellite. Vegetation indices are used to estimate vegetation, green cover, chlorophyll percentage, etc. The following vegetation indices are used: NDVI—Normalized Difference Vegetation Index, TNDVI—Transformed Normalized Difference Vegetation Index, GNDVI—Green Normalized Difference Vegetation Index, ExG—Excess Green, CIVE—Color Index of Vegetation, TGI—Triangular Greenness Index, GLI—Green leaf index, SAVI—Soil Adjustment Vegetation Index and MSAVI—modified SAVI. NDVI index is a vegetation index of global vegetation analysis, and it is important for the assessment of seasonal and perennial vegetation. Its values are from −1 to 1, usually from 0.3-0.8, and values between 0.2 and 0.3 represent grass areas. This index is negatively affected by soil color and humidity, atmospheric conditions, and dead matter in the plant. It is important, but other indices are also used because they provide better information depending on atmospheric adaptation. The TNDVI-Transformed Normalized Difference Vegetation Index is an index whose value varies from zero to one and this index represents the square root of the NDVI. For example, if the value is greater than 0.4 then we have presence of green vegetation. This is followed by the GNDVI-Green Normalized Difference Vegetation Index, which is sensitive to small amounts of chlorophyll and uses the wavelength of the green band, especially the lower ones of 550 micrometers. ExG and CIVE indices are used to estimate the region of interest in the picture where the vegetation cover is located (separation of vegetation from soil in the image). TGI and GLI indices serve as indicators of the presence of chlorophyll in the leaves. ExG, CIVE TGI and GLI are vegetation indices based on responses from the visible part of the spectrum and are used when there is no information from the infrared part of the spectrum i.e. when multispectral camera is unavailable. And finally, we have SAVI and MSAVI indexes, where MSAVI is a modified SAVI index. SAVI in its formula contains the factor of adjusting the background of the leaves and considers the brightness of the soil. Its values are in range from −1 to 1, and a lower value reflects less vegetation while a higher value reflects larger vegetation. MSAVI has no leaf background adjustment factor.

In the next step 306, the separated part of parcel 302 from the parcel boundary set in 301, is considered as a matrix of pixels in 305 with dimensions a×b, and with the third dimension which reflects the values of vegetation indices. That is, the matrix 305 is fulfilled with the values of vegetation indices 304 for each pixel within the selected part of parcel 302, and its rows correspond to pixels while columns represent vegetation indices.

The pixels from the matrix 305 are standardized in step 308 according to the values of vegetation indices, so a new matrix 307 is obtained. The standardization of the matrix results in discarding the rows of the matrix that correspond to the pixels which cover the land without vegetation.

The prepared data matrix 307 is further analyzed in step 309 with the K-means clustering method, which result is further presented in different spatial resolutions (from 1 pixel width to the width corresponding to the width of a fertilizer spreader). Each pixel from the ROI via the K-means algorithm should be associated with one of the K zones. This is done with transformation of matrix 307 in K binary matrices, where the ones indicate the affiliation of the pixels to the cluster. This is done in step 309 and one of K binary matrices is represent as a matrix 310. Clustering in different spatial resolutions in step 309 yields maps of labels 311, 312, 313, i.e., new entities (matrices) of matrix 310 depending on the change in spatial resolution. Diagonal 314 reflects this change in resolution. For each chosen spatial resolution pixels within the ROI are associated with the one of the K zones ((e.g., for k=2 we have that the pixel 315 is associated with one of the two clusters because it is labeled with 1, i.e., the cluster to which it should be, and not with 0 which is the label of the other cluster). After this step, a spatial statistic of labels is calculated for each chosen spatial resolution. Then based on calculated spatial statistics of pixels with zero and one values in matrix 310 with different spatial resolutions and maps of labels 311, 312, 313, for each pixel from the ROI, the probability with which it belongs to one of the K zones is obtained.

Label maps 311, 312 and 313, i.e., the new entities obtained from matrix 310, are further processed by calculating the number of label occurrences for the zones. In the example below, the analysis was done for two zones (two clusters), where one zone is labeled with 0 and the other with 1, and without pixels covering the soil without vegetation. With the change of spatial resolutions reflected by diagonal shift 314, each pixel 315 is linked to new values which represent the probability of belonging, e.g. 311, 312 and 313 are examples of different resolutions corresponding to the occurrence of numbers 0 and 1 given in columns 319 and 320 following resolutions 311, 312 and 313 or windows of different spatial resolution. The pixel 315 draws the highest probability of belonging to one region, while pixel 316 has the lowest. Based on the frequency of occurrence of 0 and 1 in columns 319 and 320, the final decision is made for the observed pixel 315 whether it belongs to zone 0 or 1 (0 if the cumulative sum of S column 320 is greater than the cumulative sum of S column 319 for the observed resolution 318 and vice versa. The resolution in column 318 goes from 1 to n, which is the threshold or width of the sprayer while S is the sum of ones and zeros related to columns 319 and 320 and is also located at the end of column 318. Spatial resolutions are changing until the threshold for spatial resolution is reached, which is the level of sprayer coverage n. The frequencies of label occurrence, depending on the spatial resolution, are stored in a new table, which in the first column 318 contains the number of spatial resolutions (from 1 to n are the rows of the table, where n is the level of sprayer coverage, and S is the sum of all zeros or ones). Then in the next two columns of the table are stored the number of zeros and ones for a observed label for a given matrices 311, 312, 313 of matrix 310.

In step 317, consensus is reached. The final zones and the estimation of the probability of pixel belonging to the zones in the ROI are determined based on local histograms of labels (new matrix entities) 311, 312 and 313 from clustering obtained using windows of different sizes (spatial resolutions). Based on the cumulative sum of the appearance of the label, given in columns 319 and 320, through different resolutions, the final decision is made, i.e., map of pixel belonging to the zones (FIG. 5). Variability by spatial resolutions and their further consensus led to the creation of spatial cluster boundaries. Pixel 315 based on the cumulative sum of occurrence of ones through different spatial resolutions (sum of S elements of column 319 to given resolution 318) most likely belongs to that cluster labeled with 1, in relation to pixel 316 which will most likely belong to another cluster. In this way, a further consensus takes place, which assigns the most probable label to the observed pixel based on spatial statistics of labels, resulting from K-means algorithm, for different spatial resolutions.

An additional constraint of sprayer width adjusts the algorithm for the specific application of soil sampling location determination. Considering the width of the sprayer, the obtained label map (FIG. 5*b*) is further analyzed in the same way as the result of clustering primarily, but with only one spatial resolution step equal to the width of the sprayer.

Figure 5A:
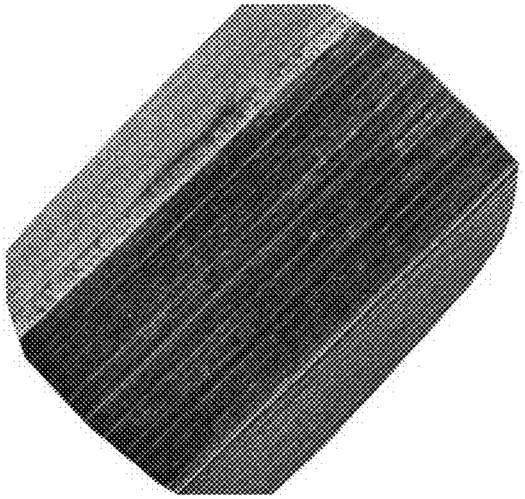
FIG. 5*a* illustrates the result of clustering by the method of K-means.
Figure 5B:
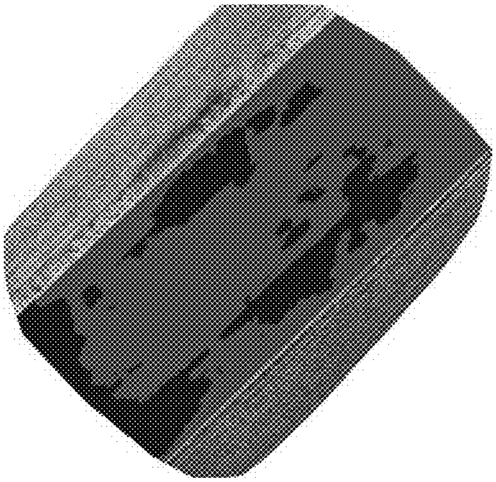
FIG. 5*b* illustrates the final classification of pixels into two zones based on the frequencies of K-means labels' appearance by varying the depth of spatial resolutions.

FIG. 5*a* illustrates the result of clustering by the method of K-means values for K=2, while FIG. 5*b* illustrates the final classification of pixels into two zones based on the frequencies of label appearance through different spatial resolutions.

In step 317, based on the map of the decision of pixel belonging to the zones and the entered capture of the sprayer, the rasterized boundaries of the zones are calculated, which are adjusted to the movement of the sprayer through the parcel. The final rasterized boundaries are obtained based on the frequency of labels from the decision map in a square region of dimensions equal to the width of the sprayer, obtained by the same procedure as for the decision maps.

Figure 6A:
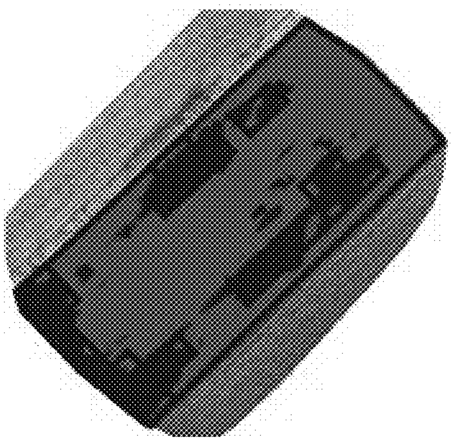
FIG. 6*a* illustrates the obtained rasterized region boundaries based on the zone decision map.
Figure 6B:
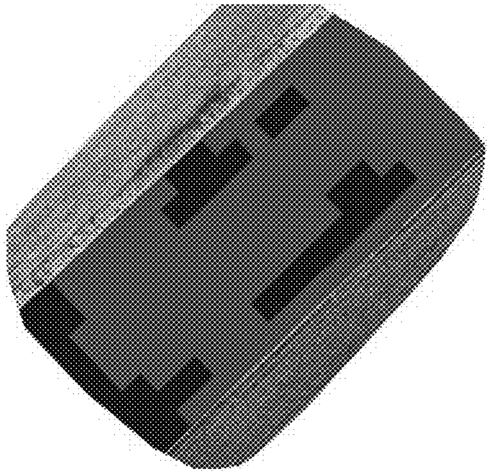
FIG. 6*b* illustrates a final rasterized map of zones obtained from label statistics calculated over window widths dictated by the fertilizer width.

FIG. 6*a* illustrates the obtained rasterized region boundaries based on the zone decision map. FIG. 6*b* illustrates a final rasterized map of zones obtained from label statistics calculated over window widths dictated by sprayer width.

Figure 7:
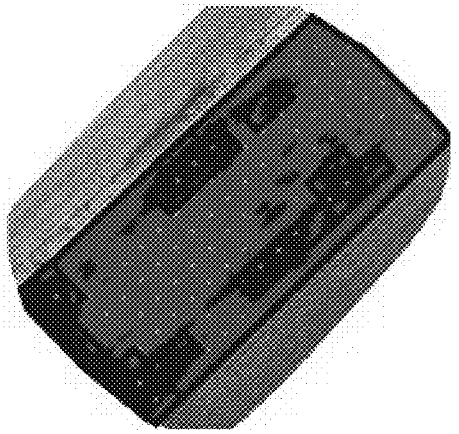
FIG. 7 illustrates a final rasterized map of zones with soil sampling points.

In addition, in step 317, sampling points within the zones are generated based on the zone boundaries in such a way that they do not fall on the boundaries of the zone decision map and the rasterized zone map boundaries and optionally not close to the parcel boundaries (user distance). In their environment, they have more than 95% of the pixels from the same zone. FIG. 7 illustrates the final map of soil sampling points. The sampling points obtained can be modified by the user if necessary (their number or position can be changed).

INDUSTRIAL APPLICABILITY

The invention finds application in smart systems for agriculture.

The invention claimed is:

1. A robotic system (100) comprising:

a robotic platform (101) configured to obtain a soil sample using a soil sampling module (102), prepare the soil sample with a sample preparation module (105), and analyze the soil sample with a sensor analysis module (108); and a robot localization module (113) configured to:

(a) receive user input to define a parcel boundary (301);

(b) determine a region of interest (ROI) (302) within the parcel boundary (301);

(c) compute vegetation indices (304) for pixels of the ROI (302);

(d) construct and normalize a data matrix (305) having pixel rows and vegetation index columns, discarding non-vegetation pixels;

(e) apply a clustering algorithm (309) on a normalized data matrix (307) followed by iterative spatial filtration across multiple spatial resolutions beginning with a 1×1 resolution and continuing until a threshold resolution (314) is reached; and (f) generate a decision map (317) assigning pixels to sampling zones, wherein the robotic platform (101) is further configured to position the soil sampling module (102) according to the sampling zones defined in the decision map (317).

2. The system (100) of claim 1, wherein the sensor analysis module (108) comprises at least one soil sensor (109) selected from the group consisting of: a nutrient sensor, a moisture sensor, a pH sensor, and a conductivity sensor, the sensor configured to generate quantitative measurements of soil properties in situ.

3. The system (100) of claim 1, wherein the robotic platform (101) comprises an anchoring module (103) configured to stabilize the platform in the soil during insertion of the soil sampling module (102), thereby reducing displacement or vibration of the sampling probe.

4. The system (100) of claim 1, wherein the sample preparation module (105) comprises a mixer (106) configured to homogenize the soil sample with water supplied from an onboard water reservoir (107), thereby producing a slurry suitable for chemical or optical analysis.

5. The system (100) of claim 1, wherein the iterative generation of normalized matrices (311, 312, 313) from a 1×1 resolution to a threshold spatial resolution (314) further comprises calculating spatial statistics of cluster labels across the resolutions, the spatial statistics being used to refine the decision map (317) for improved delineation of sampling zones.

6. The system (100) of claim 5, wherein the upper bound of the threshold spatial resolution (314) used in the spatial statistics calculation is selected to correspond to the working width of a fertilizer spreader, thereby aligning the generated sampling zones with the operational resolution of field machinery.

7. A method for soil sampling, comprising:

(a) defining a plot of land (301) for soil sampling;

(b) receiving geospatial image data from a server (111) in the form of satellite or drone imagery of the plot (301);

(c) processing the geospatial image data by calculating vegetation indices to form a data matrix (305) and normalizing the matrix to produce a vegetation-only matrix (307);

(d) applying a K-means clustering algorithm (309) to the normalized matrix (307);

(e) processing the clustering output matrix (310) with adjustable spatial resolution through spatial filtration to determine homogeneous zone boundaries and a set of optimal sampling points within each zone (317);

(f) transmitting the optimal sampling points to a robotic platform (101);

(g) controlling the robotic platform (101) to navigate to the optimal sampling points and collect soil samples; and (h) analyzing the collected soil samples and transmitting the analysis results to the server (111).

8. The method of claim 7, wherein processing the geospatial image data comprises applying the K-means clustering algorithm to the generated matrix of calculated vegetation indices (305), and associating pixels (318) with probabilities of belonging to defined zones.

9. The method of claim 8, further comprising normalizing the matrix (305) by excluding pixels corresponding to non-vegetated areas to obtain the normalized matrix (307).

10. The method of claim 8, further comprising processing the output of the K-means clustering algorithm with spatial filtration using adjustable spatial resolution represented through matrices (311, 312, 313), up to a spatial resolution determined by the working width of a fertilizer spreader (314), and calculating cumulative probabilities (319, 320) for each pixel (315, 316).

11. The method of claim 10, wherein the calculated cumulative probabilities (319, 320) are used to determine the boundaries of homogeneous zones and the soil sampling locations within them (317).

12. The method of claim 7, wherein positioning the robotic platform (101) comprises anchoring the platform in the soil at the determined sampling locations using an anchoring module (103).

13. The method of claim 12, wherein preparing the soil samples comprises mixing each soil sample with water from an onboard reservoir (107) using a mixer (106).

14. The method of claim 13, wherein analyzing the soil samples comprises measuring at least one chemical or physical property of the soil samples using one or more sensors (109).

* * * * *